(12) United States Patent
Srinivasan et al.

(10) Patent No.: US 7,941,157 B2
(45) Date of Patent: May 10, 2011

(54) HYBRID LOCALIZATION IN WIRELESS NETWORKS

(75) Inventors: Bhaskar Srinivasan, Palo Alto, CA (US); Sharmila Ravula, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 536 days.

(21) Appl. No.: 11/274,584

(22) Filed: Nov. 15, 2005

(65) Prior Publication Data

US 2007/0111735 A1     May 17, 2007

(51) Int. Cl.
*H04W 24/00*     (2009.01)
*H04L 12/28*     (2006.01)

(52) U.S. Cl. .................. 455/456.1; 370/255
(58) Field of Classification Search ............. 370/254, 370/328, 338, 255; 455/456.1–456.6, 41.1, 455/41.2, 500
See application file for complete search history.

(56) References Cited

U.S. PATENT DOCUMENTS

| | | | | |
|---|---|---|---|---|
| 7,369,524 | B2 * | 5/2008 | Taubenheim et al. | 370/328 |
| 7,433,648 | B2 * | 10/2008 | Bridgelall | 455/41.2 |
| 2002/0019698 | A1 | 2/2002 | Vilppula et al. | |
| 2004/0259566 | A1 * | 12/2004 | Maanoja et al. | 455/456.1 |
| 2006/0203762 | A1 * | 9/2006 | Taubenheim et al. | 370/328 |
| 2006/0221864 | A1 * | 10/2006 | Niu et al. | 370/255 |

FOREIGN PATENT DOCUMENTS
EP      1443791 A1      8/2004

OTHER PUBLICATIONS

Yedavalli, K. K. "Location Determination using IEEE 802.11b" Master of Science Thesis, *University of Colorado, Boulder*, Dec. 2002.
He, T., et al. "Range-Free Localization Schemes for Large Scale Sensor Networks" Sep. 2003 MobiCom '03, San Diego, CA.
Savvides, A., et al. "Dynamic Fine-Grained Localization in Ad-Hoc Networks of Sensors" *Proceedings of the Fifth International Conference on Mobile Computing and Networking, Mobicom 2001*, pp. 166-179, Rome, Italy, Jul. 2001.
Yedavalli, K. K., et al. "Ecolocation: A Sequence Based Technique for RF Localization in Wireless Sensor Networks", *The Fourth International Conference on Information Processing in Sensor Networks (IPSN '05)*, Los Angeles, CA, Apr. 2005.
Form EPO 1507N, "European Patent Office Communication," 1 pg.
Form EPO 1503, "European Search Report," 2 pgs.
Form EPO 1703, "Examination," 2 pgs.
Yedavalli, K., et al.; "Ecolocation: a sequence based technique for RF localization in wireless sensor networks" Information Processing in Sensor Networks, 2005. IPSN 2005. Fourth International Symposium on Los Angeles, CA USA Apr. 25-27, 2005, Piscataway, NJ, USA, IEEE, Apr. 25, 2005, pp. 285-292, XP010807228.

* cited by examiner

*Primary Examiner* — George Eng
*Assistant Examiner* — Nam Huynh
(74) *Attorney, Agent, or Firm* — Dergosits & Noah LLP; Geoffrey T. Staniford (57) ABSTRACT

A hybrid localization method and a wireless network that performs the method are disclosed herein. In an embodiment of a hybrid localization technique, one or more sensor nodes in the network switch between different localization techniques depending on location area conditions. This technique chooses the most accurate localization technique for the given location area conditions, and thus potentially provides the best possible location accuracy for those conditions. A representative set of simulations and experiments verify the potential performance improvement realized with embodiments of the hybrid localization technique.

17 Claims, 6 Drawing Sheets

HYBRID LOCALIZATION IN WIRELESS NETWORKS

TECHNICAL FIELD

The disclosed embodiments relate to distributed wireless sensor networks.

BACKGROUND OF THE DISCLOSURE

Distributed networks of wireless sensors have been developed to provide information about remote objects and locations. For example, wireless sensor networks provide distributed remote access to sensors, controls, and processors that are deeply embedded in equipment, facilities, and the environment. Sensor networks provide monitoring and control capability for applications in transportation, manufacturing, health care, environmental monitoring, military, and safety and security. Characteristics of wireless network sensors include small size, low power requirements, and one or more sensing and communication capabilities. These sensors are typically required to provide low power signal processing, low power computation, and low power, low cost wireless networking capability in a compact system.

Many tiny embedded sensor devices, equipped with various sensing and communication capabilities, form an ad-hoc network. The sensors can collaborate, exchange information, and report information outside of the network. For example, sensors embedded in cargo shipments can monitor conditions at the location of the cargo, such as temperature and humidity. For the sensed information to be most useful, it is usually necessary for the location of the sensor to be available. Therefore, a sensor is typically capable of localization, or determining its location in space. In addition to reporting the location of sensed information, localization is needed for facilitating routing in large ad-hoc networks. Localization is also required if it is desired to collect network survey information that can be used to study and characterize the network as a whole.

The incorporation of localization in wireless sensor networks is a complex undertaking. Sensor networks can be quite large and consist of sensors deployed in an ad-hoc fashion. In addition, the inherent constraints of the sensors themselves (including small size, low power consumption, and low cost) make it impractical to supply individual sensors with significant resources dedicated to localization. Localization becomes even more challenging when it is required to provide good location accuracy using only the signal strength of radio frequency (RF) signals. Many localization techniques using received signal strength (RSS) of RF signals have been proposed over years. Examples of such localization techniques are described in: [1] "Ecolocation: A Sequence Based Technique for RF Localization in Wireless Sensor Networks", Kiran Yedavalli, Bhaskar Krishnamachari, Sharmila Ravula, Bhaskar Srinivasan, *The Fourth International Conference on Information Processing in Sensor Networks (IPSN '05)*, Los Angeles, Calif., April 2005; [2] "Determination Using IEEE 802.11b", Master of Science Thesis, Kiran Yedavalli, University of Colorado, Boulder, December 2002; [3] "Range-Free Localization Schemes for Large Scale Sensor Networks", T. He, C. Huang, B. M. Blum, J. A. Stankovic and T. Abdelzaher, *MobiCom '03*, San Diego, Calif., September 2003; and [4] "Dynamic Fine Grained Localization in Ad-Hoc Sensor Networks", A. Savvides, C. C. Han and M. B, *Proceedings of the Fifth International Conference on Mobile Computing and Networking, Mobicom* 2001, pp. 166-179, Rome, Italy, July 2001.

Figure 1:
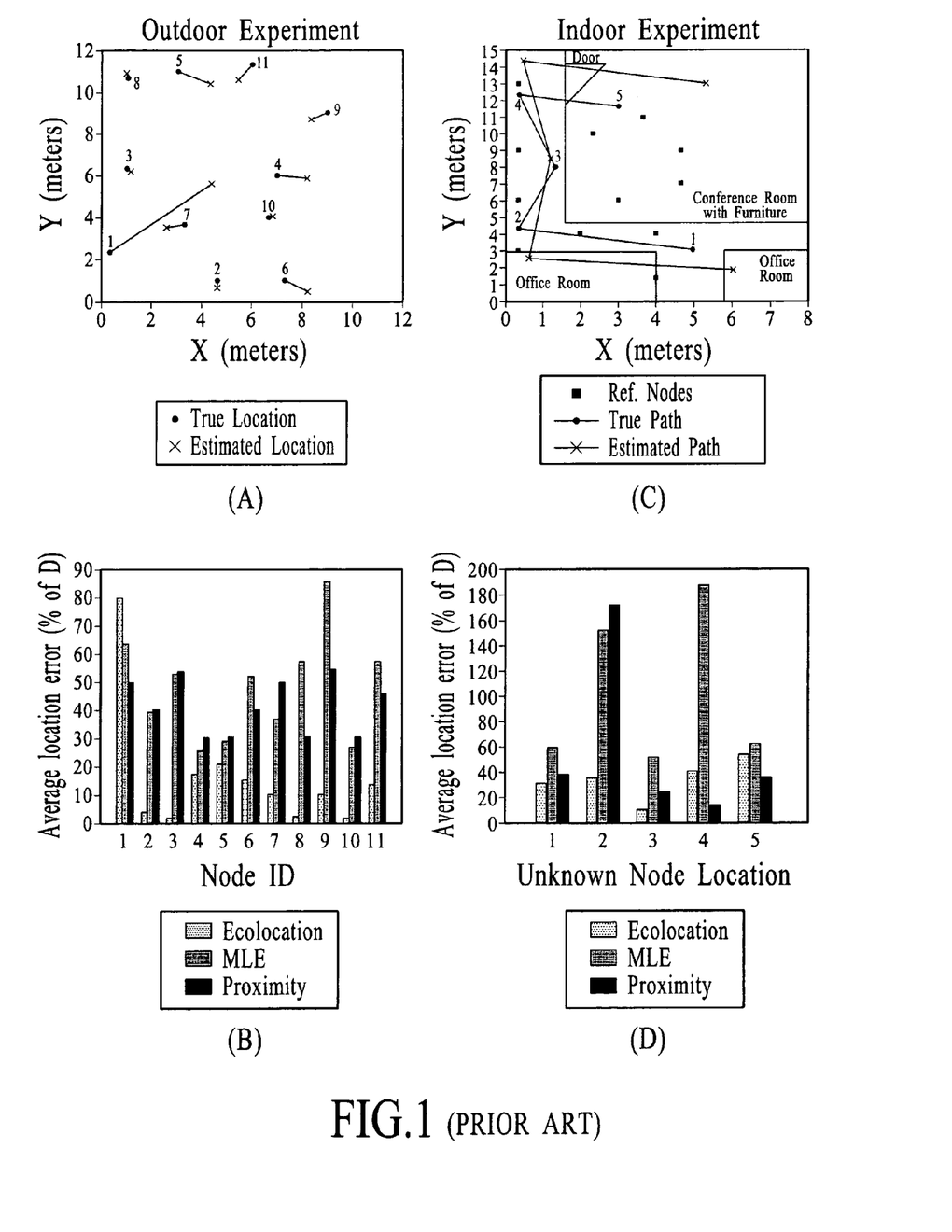
FIG. 1A is a diagram of true sensor locations and Ecolocation location estimates using existing methods in an outdoor experiment.
FIG. 1B is a graph of location error for various existing location techniques for the experiment of FIG. 1A.
FIG. 1C is a diagram of true path and Ecolocation estimated path using existing methods in an indoor experiment.
FIG. 1D is a graph of location error for various existing location techniques for the experiment of FIG. 1C.

The relative performance of exiting RSS techniques depends on various location area conditions. Therefore, one technique may provide acceptable accuracy under particular location conditions, but unacceptable accuracy under different location conditions. FIGS. 1A, 1B, 1C, and 1D illustrate how location area conditions affect location technique accuracy. FIGS. 1A and 1B show results of location experiments conducted outdoors. FIGS. 1C and 1D show results of location experiments conducted indoors. All of the experiments were conducted using Berkeley MICA 2 motes. A mote is a wireless receiver/transmitter that is typically combined with a sensor of some type to create a remote sensor. Some motes are designed to be incredibly small so that they can be deployed by the hundreds or even thousands for various applications. Three different localization techniques—Ecolocation [1], Maximum Likelihood Estimator (MLE) [2] and Proximity [1]—are compared and for each location point.

Referring to FIG. 1A, in the outdoor experiment, a comparison was made between true locations and Ecolocation location estimates. 11 MICA 2 motes, placed randomly in a 144 sq. meters area, were used as reference nodes as well as unknown nodes. Consequently, each unknown node had 10 reference nodes. FIG. 1B shows the location error due to Ecolocation, MLE and Proximity for the outdoor experiment.

Referring to FIG. 1C, a comparison between true path and Ecolocation estimated path was made in the indoor experiment. 12 MICA 2 motes, placed randomly in a 120 sq. meters area, were used as reference nodes. The location of the unknown node was estimated for 5 different locations using the 12 reference nodes. FIG. 1D shows the location error due to Ecolocation, MLE and Proximity for the indoor experiment.

It can be seen that, even though Ecolocation performs the best for most of the cases, for some points other techniques provide better accuracy.

DETAILED DESCRIPTION

A hybrid localization method and a network that performs the method are disclosed herein. In an embodiment of a hybrid localization technique, one or more sensors in the network switch between different localization techniques depending on location area conditions. This technique chooses the most accurate localization technique for the given location area conditions, and thus potentially provides the best possible location accuracy for those conditions. A representative set of simulations and experiments verify the potential performance improvement realized with embodiments of the hybrid localization technique. The embodiments described herein are illustrates using particular examples of wireless networks, specifically sensor networks. However, the embodiments are equally application to an any wireless networks, for example wireless local area networks (LANs), Bluetooth networks, ultra-wideband (UWB) networks, worldwide interoperability for microwave access (WiMAX) networks, cellular GSM networks, cellular CDMA networks, etc.

Figure 2:
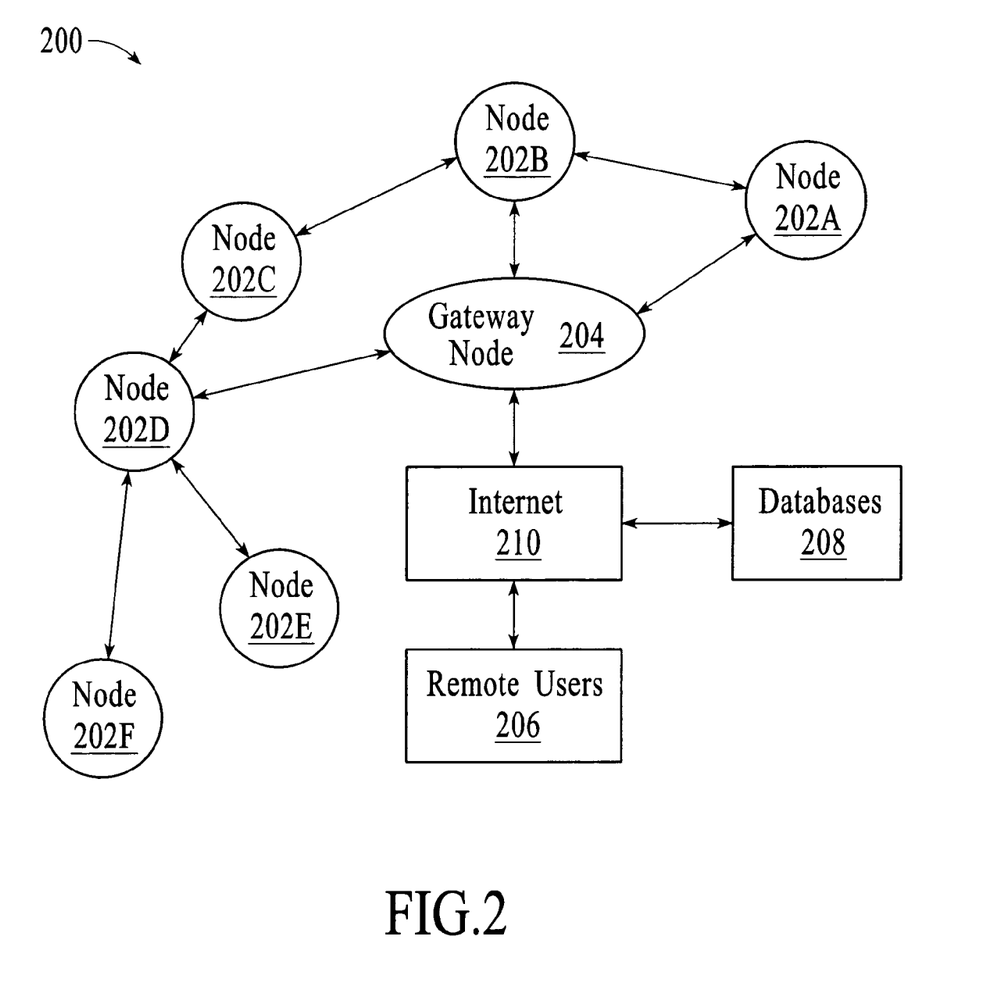
FIG. 2 is a block diagram of a distributed wireless sensor network according to an embodiment.

FIG. 2 is a block diagram of a distributed wireless sensor network in and environment 200 according to an embodiment. The network includes sensor nodes 202 (including nodes 202A-202F, in this example), and gateway node 204. The sensor nodes 202 include any combination of actuators, sensors, signal processors, energy or power supplies, data storage devices, wireless communication devices, wireline communication devices, and self-location (also referred to herein as "localization") capabilities, including localization hardware and software. The sensor nodes 202 are distributed in the environment 200, which is to be monitored or controlled. The network 200 can include heterogeneous elements. The network 200 is self-organizing in that it has the ability to distribute come combination of information and energy. The network 200 interacts with remote users 206 and databases 208 when coupled to the Internet 210 or other networks through the gateway node 204. The remote users 206 represents both human and non-human users, as well as hardware and software devices used by the remote user to communicate with the wireless sensor network. Sensor node 202 data is transferred over a wireless link to the users 206 or to a conventional wireless network, such as an Internet protocol network (not shown), through the gateway 204 or through a network bridge (not shown).

In an embodiment, the sensor nodes 202 are remotely programmable. Software is downloadable from storage locations in the sensor node network, or via the Internet 210 from remote user locations or databases 208. Results or data products of the sensor nodes 202 may be remotely queried. Additionally, the sensor network is capable of supporting distributed processing and data storage functions in accordance with varying sensor node capabilities and application demands.

For embodiments described herein one or more of the sensors 202 are capable of performing hybrid localization. Various localization techniques estimate the location of a sensor node in a wireless sensor network with an unknown location (also referred to as an "unknown node") using a set of nodes with known locations (also referred to as "reference nodes"). In various embodiments, one or more of the sensor nodes decides to switch between different localization techniques, is based on a variety of possible metrics. These metrics include the following metric, but the list is not intended to be exhaustive.

Node deployment conditions: Localization techniques which inherently perform better than other techniques for the given location area node deployment conditions can be chosen. Some representative node deployment parameters are the number of reference nodes ($\alpha$), reference node density ($\beta$) and the location area ($\lambda$).

Radio Frequency ("RF") channel conditions: Localization techniques that inherently provide the best accuracy for the given wireless channel conditions can be chosen. The main RF channel conditions are the path loss exponent ($\eta$) and the standard deviation in received signal strength ("RSS") measurement in dB ($\sigma$).

Location Probability (p(x, y)): The probability with which an unknown node can exist at a given location can be used for good decision accuracy. This probability can change with space or time. For example, a person whose location needs to be determined is more likely to be at his work place or in the corridor than in the space occupied by the book shelf for all times. Similarly, he is more likely to be in the cafeteria than in his work place at lunch time.

Confidence Metrics: Fundamental constraints on the unknown node location imposed by the topology of reference nodes can be used to construct confidence metrics. These constraints are violated, for example, due to the RF channel conditions. The concept of such fundamental constraints is set forth in "Ecolocation: A Sequence Based Technique for RF Localization in Wireless Sensor Networks", as cited above. Through simulations it has been observed that when the number of constraint violations increase, the accuracy due to Ecolocation is more likely to degrade. Therefore, the number of constraint violations can be used as a confidence metric that can give good decision accuracy.

Statistical Switching: Switching based on pre-simulated/experimented results can be expected to give good decision accuracy. The metrics that can be used in the switching decision are preferably not specific to any particular localization technique but are generic enough to affect all localization techniques.

Figure 3:
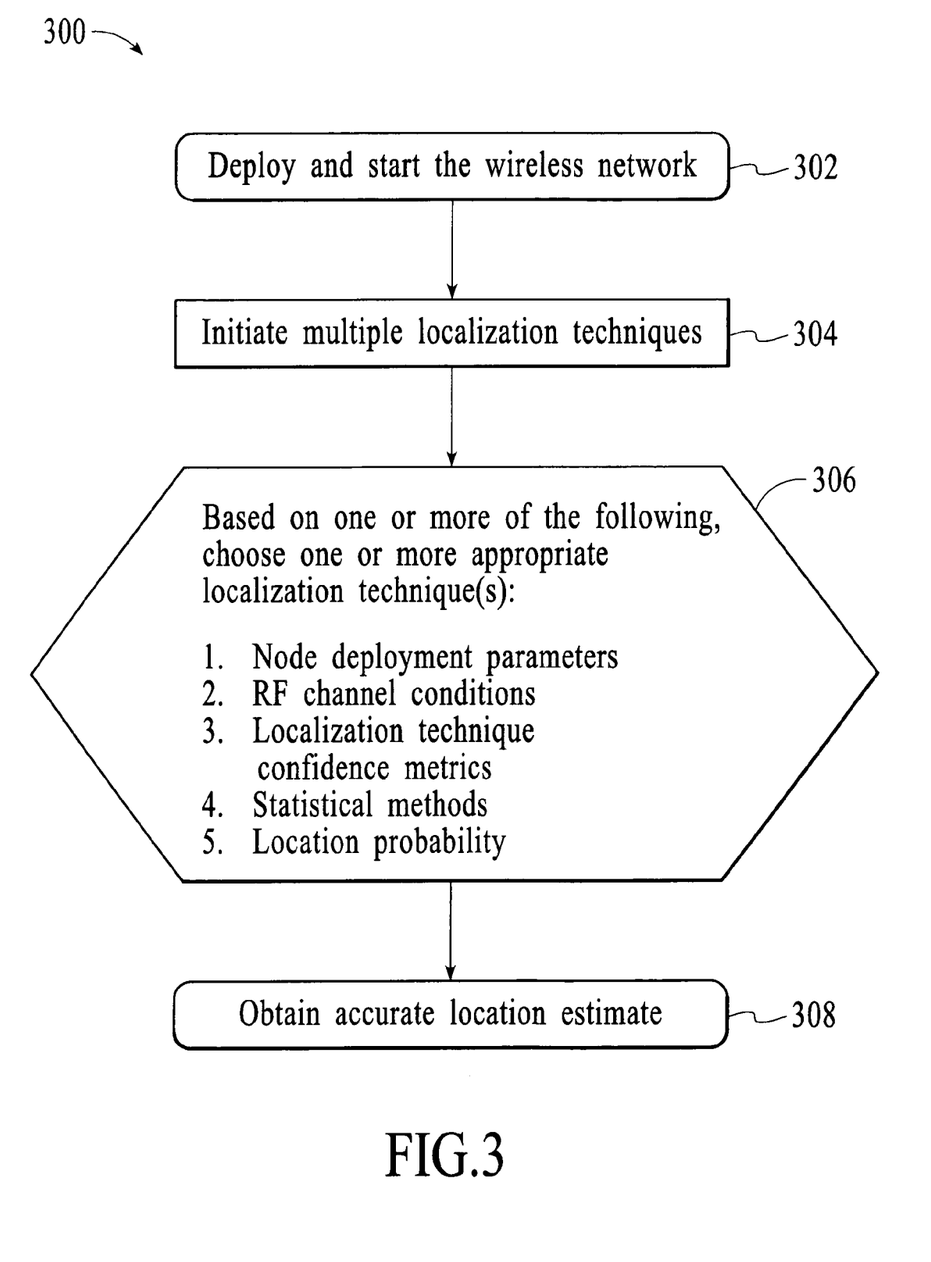
FIG. 3 is a flow diagram of a hybrid localization method according to an embodiment.

FIG. 3 is a flow diagram of a hybrid localization method 300 according to an embodiment. At 302, the wireless network is deployed and initialized. At 304, multiple localization techniques are initiated. The multiple localization techniques can be any techniques discussed herein and additional techniques not specifically mentioned. The multiple localization techniques may be performed by all of the sensor nodes in the wireless network such that each node performs the same technique at the same time. Alternatively, different techniques may be performed by different nodes at different times. In various embodiments, the sensor nodes in the wireless network communicate with each other regarding specific localization techniques and results of the specific localization techniques so that the particular techniques performed are chosen adaptively based on the results. In some embodiments, the sensors in the wireless network cooperate to perform the hybrid localization process according to capability preprogrammed in each sensor. In other embodiments, an initialization and localization phase may include the participation of a remote user and/or a gateway to direct and/or control the hybrid localization process.

At 306, it is determined, based on one or more predetermined metrics, which localization technique is the most appropriate. In an embodiment, the predetermined metrics include node deployment parameters, RF channel conditions, localization technique confidence metrics, statistical methods, and location probability, but embodiments are not so limited. In various embodiments, the appropriate localization technique can be determined for each individual sensor. In other embodiments, the appropriate localization technique can be determined for groups of sensors based on a common attribute, characteristic, or environmental condition. At 308, an accurate location estimate is obtained for each sensor in the wireless network using the chosen localization technique.

Figure 4:
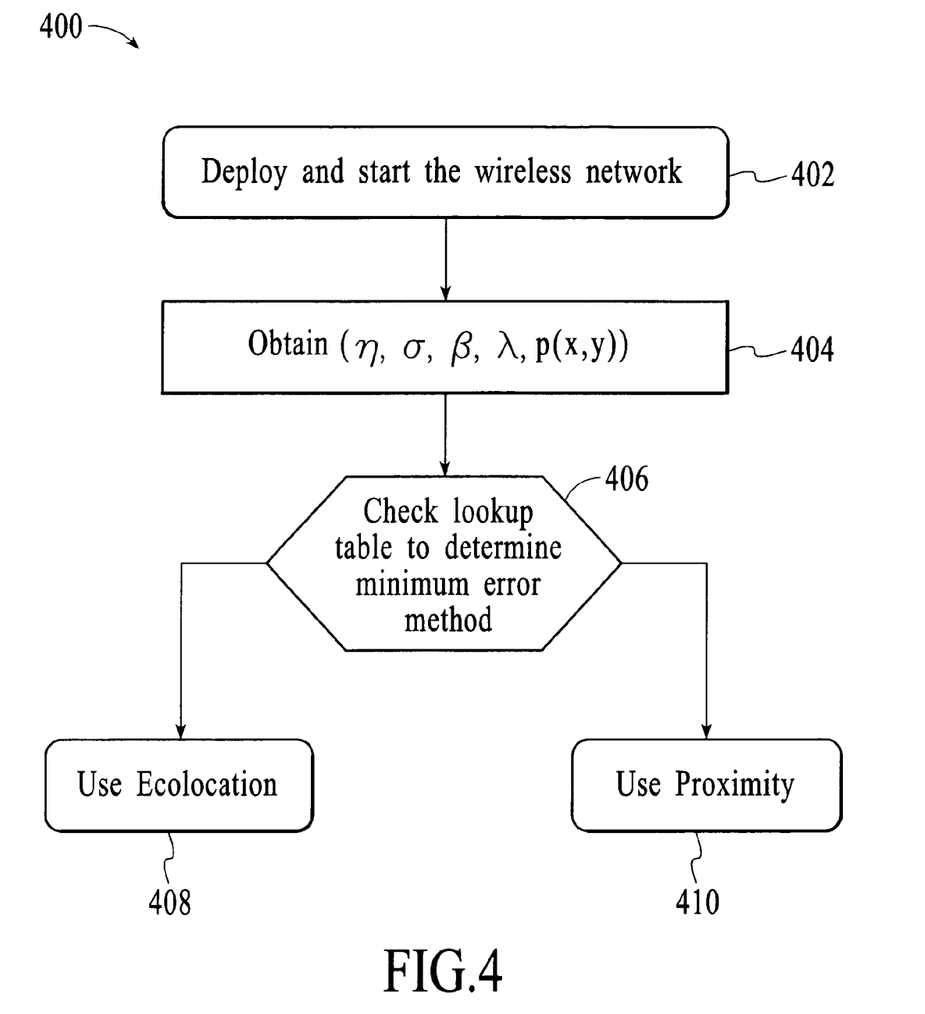
FIG. 4 is a flow diagram of a hybrid localization method according to an embodiment.

FIG. 4 is a flow diagram of a specific hybrid technique 400 that is performed by the sensor network according to an embodiment in which one of Ecolocation or Proximity is chosen as a localization technique. At 402, a wireless sensor network, such as the network illustrated in FIG. 2, is deployed and initiated. The various capabilities of the network as described with reference to FIG. 3 are also applicable to the network performing the method and process of FIG. 4. At 404, parameters $\eta$ (path loss exponent), $\sigma$ (standard deviation), $\alpha$ (number of reference nodes), $\beta$ (reference node density), $\lambda$ (location area), and p(x, y) (location probability) are obtained.

Figure 5:
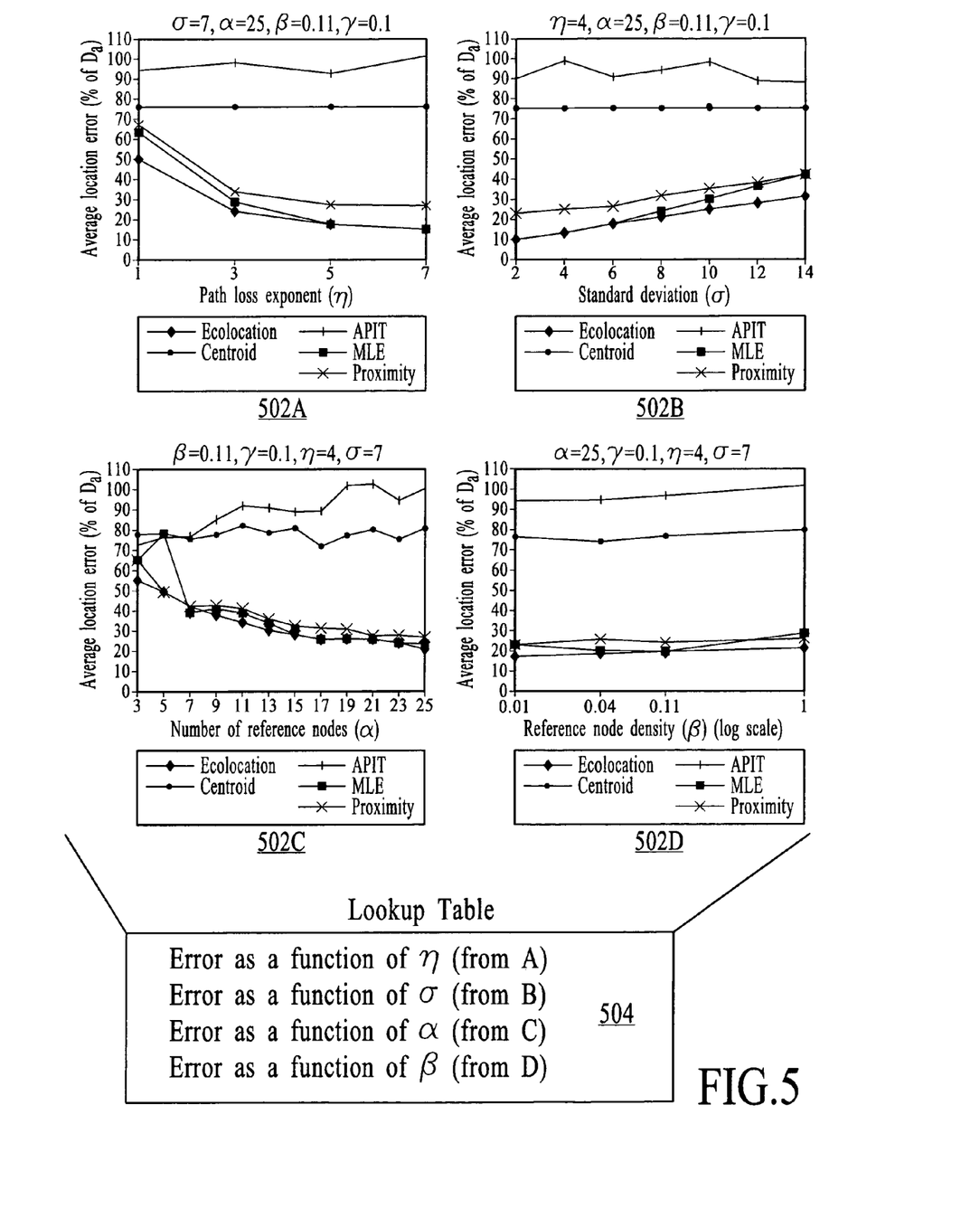
FIG. 5 is a diagram of contents of a lookup table including average error values for different localization techniques according to an embodiment.

With reference to FIG. 5, the average location error as a function of various parameters can be plotted for different localization techniques. For example, graph 502A is a plot of average location error as a function of $\eta$ (path loss exponent) for fixed values of $\sigma$, $\alpha$, $\beta$, and $\gamma$. Graph 502B is a plot of average location error as a function of $\sigma$ (standard deviation) for fixed values of $\eta$, $\alpha$, $\beta$, and $\gamma$. Graph 502C is a plot of average location error as a function of $\alpha$ (number of reference nodes) for fixed values of $\beta$, $\gamma$, $\eta$, and $\sigma$. Graph 502DC is a plot of average location error as a function of $\beta$ (reference node density) for fixed values of $\alpha$, $\gamma$, $\eta$, and $\sigma$. Each of the graphs 502 includes a plot for each of several localization techniques, including Ecolocation, Centroid, Approximate point-in-triangulation (APIT), Maximum likelihood estimator (MLE), and Proximity, showing average error as a function of the parameter for each technique. In an embodiment, the data in the graphs 502 is collected in a lookup table 504.

Referring again to FIG. 4, once $\eta$, $\sigma$, $\alpha$, $\beta$, $\lambda$, and p(x, y) are obtained, the lookup table 504 is checked at 406 to determine the localization method or technique (Ecolocation or Proximity) with the smallest error. If Ecolocation showed a smaller average error than Proximity, Ecolocation is used at 408 to obtain a location estimate. If Proximity showed a smaller average error than Ecolocation, Proximity is used at 410 to obtain a location estimate.

Figure 6:
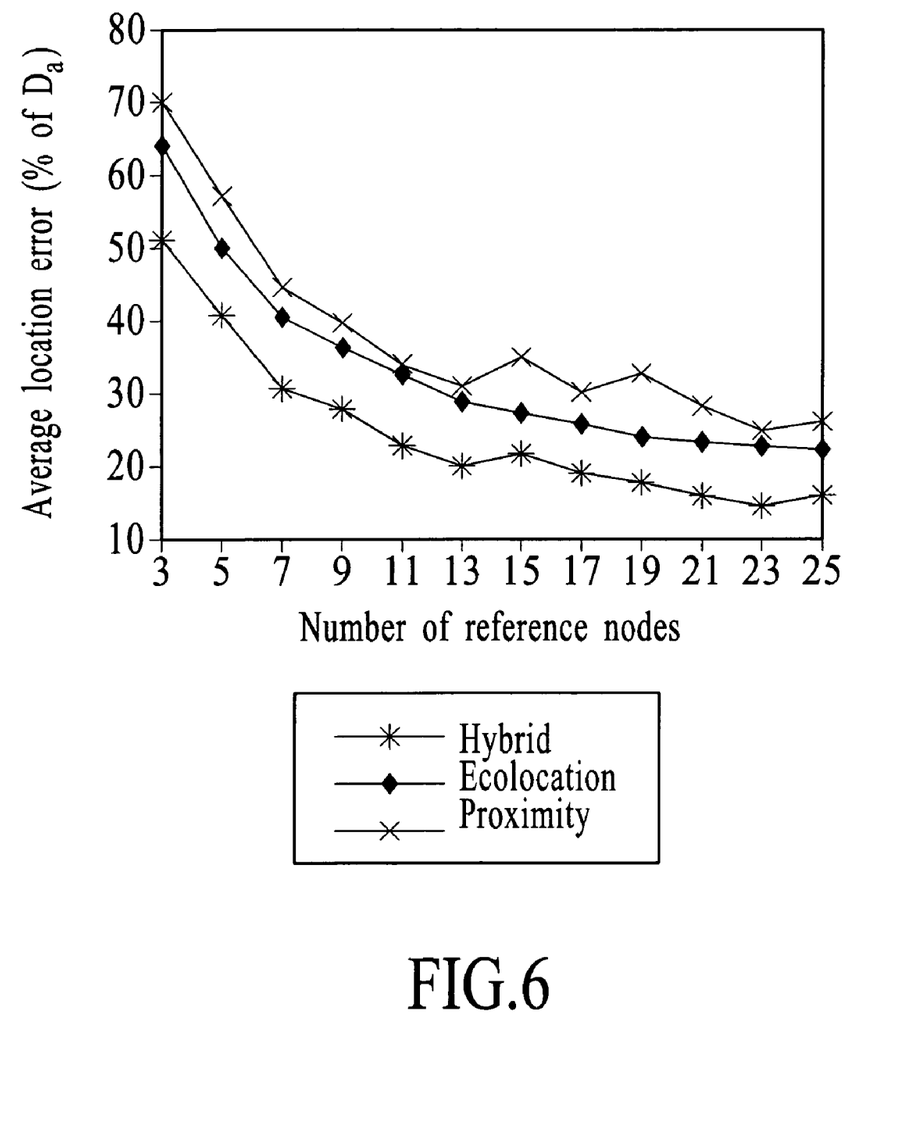
FIG. 6 is a diagram comparing average error for hybrid localization according to embodiments described herein to average error for previous localization methods.

FIG. 6 is a diagram comparing average error for hybrid localization according to embodiments described herein to average error for previous localization methods. Specifically, results for a hybrid techniques such as illustrated in FIGS. 4 and 5 is compared to results for each of Ecolocation and Proximity techniques. Average location error (as a percentage of average inter reference node distance) as a function of the number of reference nodes is shown. FIG. 6 plots the average location error for a 100 trial simulation for each of Ecolocation and Proximity as a function of the number of reference nodes. A hybrid technique as described herein is also plotted. The Hybrid curve plots the average of the least error in each of the 100 trials. Evidently, hybrid localization provides better accuracy than any single localization technique. Even though only two localization techniques have been used here as an example, embodiments are easily extended to multiple localization techniques.

Aspects of the methods and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Embodiments may also be implemented as microcontrollers with memory (such as electrically erasable programmable read-only memory ("EEPROM")), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, etc.

The various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., hypertext transfer protocol ("HTTP"), file transfer protocol ("FTP"), simple mail transfer protocol ("SMTP"), etc.).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

The above description of illustrated embodiments is not intended to be exhaustive or limited by the disclosure. While specific embodiments of, and examples are described herein for illustrative purposes, various equivalent modifications are possible, as those skilled in the relevant art will recognize. The teachings provided herein can be applied to other systems and methods, and not only for the systems and methods described above. The elements and acts of the various embodiments described above can be combined to provide further embodiments. These and other changes can be made to methods and systems in light of the above detailed description.

In general, in the following claims, the terms used should not be construed to be limited to the specific embodiments disclosed in the specification and the claims, but should be construed to include all systems and methods that operate under the claims. Accordingly, the method and systems are not limited by the disclosure, but instead the scope is to be determined entirely by the claims. While certain aspects are presented below in certain claim forms, the inventors contemplate the various aspects in any number of claim forms. For example, while only one aspect is recited as embodied in a machine-readable medium, other aspects may likewise be embodied in a machine-readable medium. Accordingly, the inventors reserve the right to add additional claims after filing the application to pursue such additional claim forms for other aspects as well.

What is claimed is:

1. A method comprising:
   at least one sensor node in a wireless sensor network performing a plurality of localization techniques;
   the at least one sensor node choosing at least one of the plurality of localization techniques based in part on at least one of a plurality of predetermined metrics;
   at least one other sensor node in the wireless network performing the plurality of localization techniques;
   the at least one other sensor node choosing at least one of the plurality of localization techniques based on at least one of the plurality of predetermined metrics;
   the at least one sensor node and the at least one other sensor node generating respective locations estimates using respective chosen localization techniques;
   collecting data regarding an average location error for different localization techniques as a function of a plurality of parameters applicable to the wireless sensor network; and
   deploying the wireless sensor network;
   initiating the wireless sensor network;
   obtaining values of the parameters applicable to the wireless sensor network; and
   looking up the collected data to determine a minimum error localization technique.

2. The method of claim 1, wherein the plurality of predetermined metrics comprises:
   node deployment parameters;
   radio frequency (RF) channel conditions;
   localization technique confidence metrics;
   statistical methods; and
   location probability.

3. The method of claim 1, wherein the plurality of localization techniques comprises:
   ecolocation;
   centroid;
   approximate point-in-triangulation (APIT);
   maximum likelihood estimator (MLE); and
   proximity.

4. The method of claim 1, further comprising the at least one sensor using the minimum error localization technique to generate a location estimate.

5. The method of claim 1, wherein the plurality of parameters comprise:
   $\eta$ (path loss exponent);
   $\sigma$ (standard deviation);
   $\alpha$ (number of reference nodes);
   $\beta$ (reference node density);
   $\lambda$ (location area); and
   p(x, y) (location probability).

6. A wireless sensor network, comprising:
   a plurality of networked wireless sensor nodes, wherein each of the plurality of wireless sensor nodes comprises localization hardware and software, wherein the localization hardware and software is configured to perform a hybrid localization technique that chooses an appropriate respective localization technique among a plurality of localization techniques to be performed by each of the sensor nodes, the technique considering respective environments of each of the nodes,
   wherein at least one sensor node chooses at least one of the plurality of localization techniques based in part on at least one of a plurality of predetermined metrics, at least one other sensor node in the wireless network performs the plurality of localization techniques with the at least one other sensor node choosing at least one of the plurality of localization techniques based on at least one of the plurality of predetermined metrics, and the at least one sensor node and the at least one other sensor node generate respective locations estimates using respective chosen localization techniques, the localization hardware and software further configured to:
   collect data regarding an average location error for different localization techniques as a function of a plurality of parameters applicable to the wireless sensor network;
   obtain values of the parameters applicable to the wireless sensor network after deployment and initiation of the wireless network; and
   look up the collected data to determine a minimum error localization technique.

7. The system of claim 6, wherein at least one of the plurality of wireless nodes comprises the localization hardware and software.

8. The system of claim 6, wherein more than one of the plurality of wireless nodes comprises the localization hardware and software in a distributed manner.

9. The network of claim 6, further comprising:
   a gateway node configured to couple to a plurality of networks, including the Internet; and
   a database accessible to the network via the gateway node.

10. The network of claim 9, further comprising a remote user coupled to the network, wherein the remote user configures the network to perform the hybrid localization technique.

11. The network of claim 6, wherein results of performing the plurality of localization techniques is stored in the database.

12. The network of claim 6, wherein results of performing the plurality of localization techniques is stored in a distributed manner in at least one of the wireless nodes.

13. A non-transitory computer-readable medium storing instructions which, when executed in a wireless sensor network, cause a hybrid localization method to be performed, the method comprising:
   at least one sensor node in a wireless network performing a plurality of localization techniques;
   the at least one sensor node choosing at least one of the plurality of localization techniques based on at least one of a plurality of predetermined metrics;
   at least one other sensor node in the wireless network performing the plurality of localization techniques;
   the at least one other sensor node choosing at least one of the plurality of localization techniques based on at least one of the plurality of predetermined metrics; and
   the at least one sensor node and the at least one other sensor node generating respective locations estimates using respective chosen localization techniques;
   collecting data regarding an average location error for different localization techniques as a function of a plurality of parameters applicable to the wireless network; and
   deploying the wireless sensor network;
   initiating the wireless sensor network;
   obtaining values of the parameters applicable to the wireless sensor network; and
   looking up the collected data to determine a minimum error localization technique.

14. The computer-readable medium of claim 13, wherein the plurality of predetermined metrics comprises:
   node deployment parameters;
   radio frequency (RF) channel conditions;
   localization technique confidence metrics;
   statistical methods; and
   location probability.

15. The computer-readable medium of claim 13, wherein the plurality of localization techniques comprises:
ecolocation;
centroid;
approximate point-in-triangulation (APIT);
maximum likelihood estimator (MLE); and
proximity.

16. The computer-readable medium of claim 13, wherein the method further comprises the at least one node using the minimum error localization technique to generate a location estimate.

17. The computer-readable medium of claim 13, wherein the plurality of parameters comprise:
$\eta$ (path loss exponent);
$\sigma$ (standard deviation);
$\alpha$ (number of reference nodes);
$\beta$ (reference node density);
$\lambda$ (location area); and
$p(x, y)$ (location probability).

* * * * *